(12) United States Patent
Ertel et al.

(10) Patent No.: US 8,707,904 B2  
(45) Date of Patent: Apr. 29, 2014

(54) HEATABLE FLOOR FOR LIVESTOCK STALLS

(75) Inventors: Thomas Ertel, Holzminden (DE); Johannes Weber-Monecke, Hachenburg (DE); Roland Frank, Kamen-Heeren (DE); Andreas Menne, Froendenberg (DE); Werner Drees, Werl (DE)

(73) Assignee: Mik International AG, Werl (DE)

( * ) Notice: Subject to any disclaimer, the term of this patent is extended or adjusted under 35 U.S.C. 154(b) by 162 days.

(21) Appl. No.: 12/998,564

(22) PCT Filed: Oct. 30, 2009

(86) PCT No.: PCT/EP2009/007788  
§ 371 (c)(1),  
(2), (4) Date: Jul. 11, 2011

(87) PCT Pub. No.: WO2010/051944  
PCT Pub. Date: May 14, 2010

(65) Prior Publication Data  
US 2011/0259279 A1 Oct. 27, 2011

(30) Foreign Application Priority Data  
Nov. 4, 2008 (DE) .......................... 10 2008 055 777

(51) Int. Cl.  
*A01K 1/00* (2006.01)

(52) U.S. Cl.  
USPC ........... 119/525; 119/448; 119/450; 119/28.5

(58) Field of Classification Search  
USPC .................. 119/525, 28.5, 448, 450; 219/217  
See application file for complete search history.

(56) References Cited

U.S. PATENT DOCUMENTS 2,799,481 A * 7/1957 Becker .......................... 165/171  
4,652,726 A * 3/1987 Femino et al. ................ 219/217  
(Continued)

FOREIGN PATENT DOCUMENTS

DE 20 2007 009 508 10/2007  
EP 1 488 692 12/2004

OTHER PUBLICATIONS

International Search Report in PCT/EP2009/007788, Feb. 8, 2010.

*Primary Examiner* — Isam Alsomiri  
*Assistant Examiner* — Justin Benedik  
(74) *Attorney, Agent, or Firm* — Collard & Roe, P.C.

(57) ABSTRACT

The invention relates to a heatable floor for livestock stalls comprising a plurality of hollow, right-angled plate elements whose hollow spaces are filled with a heat transfer fluid and can be heated by means of heating lines (11) running through the hollow spaces, wherein each plate element comprises one upper shell (1) having an inlet opening (5) and forming a standing surface for the livestock and one lower shell (7) supporting the upper shell (1), the shells being connected to one another liquid-tight at their edges and having means for suspending carriers and being supported on one another by supports (6, 9) that run through the hollow space. In order to enable filling of the plate element without bubbles in the floor with increased stability of the plate element, the invention proposes that the supports be formed by laterally open pipe nozzles with round or cornered cross-sections, at least in the region adjacent to the upper shell (1) from below, the lateral openings of the pipe nozzles all being aligned to a filling opening (5) located on the edge of the upper shell (1).

12 Claims, 11 Drawing Sheets

(56) References Cited

U.S. PATENT DOCUMENTS

Figure 1:
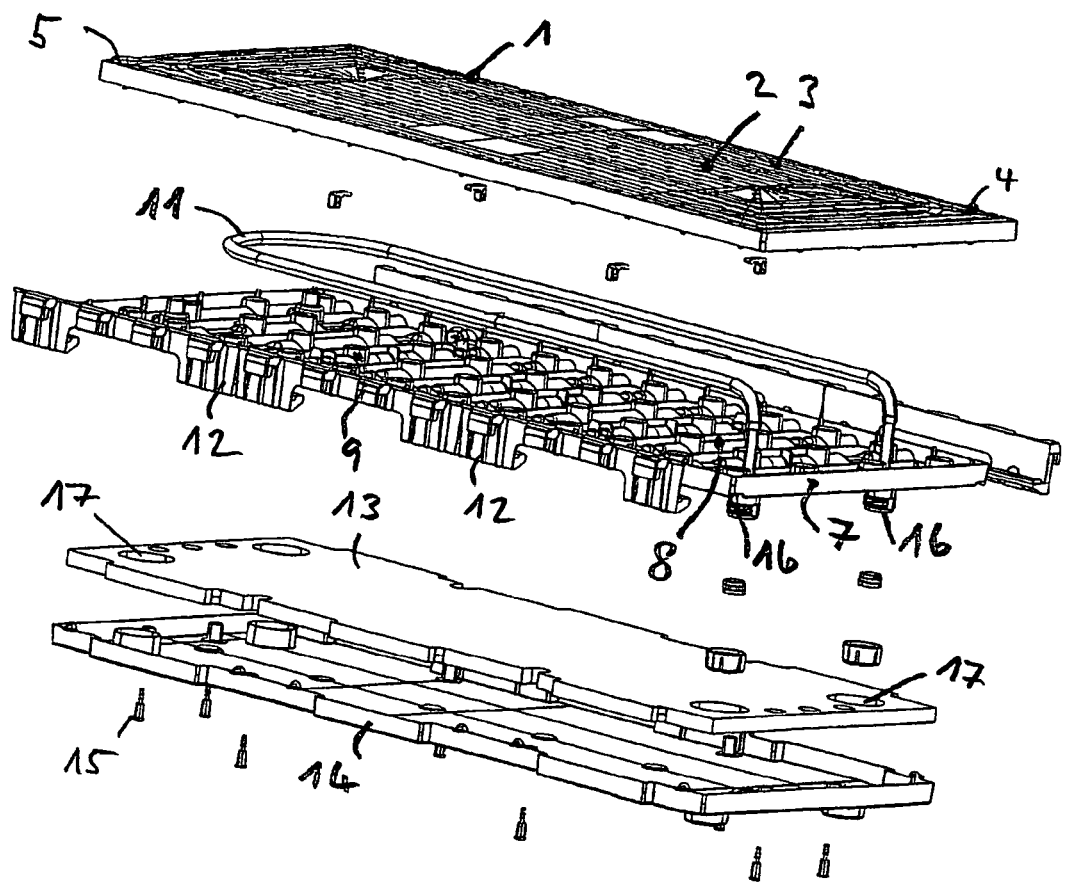

| | | | | |
|---|---|---|---|---|
| 4,865,120 A | * | 9/1989 | Shiroki | 165/56 |
| 5,078,203 A | * | 1/1992 | Shiroki | 165/56 |
| 5,082,712 A | * | 1/1992 | Starp | 428/95 |
| 5,245,805 A | * | 9/1993 | Takeda et al. | 52/126.6 |
| 5,456,209 A | * | 10/1995 | Heinrich | 119/450 |
| 5,509,244 A | * | 4/1996 | Bentzon | 52/387 |
| 6,084,209 A | * | 7/2000 | Reusche et al. | 219/217 |
| 6,622,652 B1 | * | 9/2003 | Wang | 119/28.5 |
| 6,752,203 B2 | * | 6/2004 | Kurita | 165/169 |
| 7,185,610 B2 | * | 3/2007 | Romeu Guardia | 119/448 |

* cited by examiner

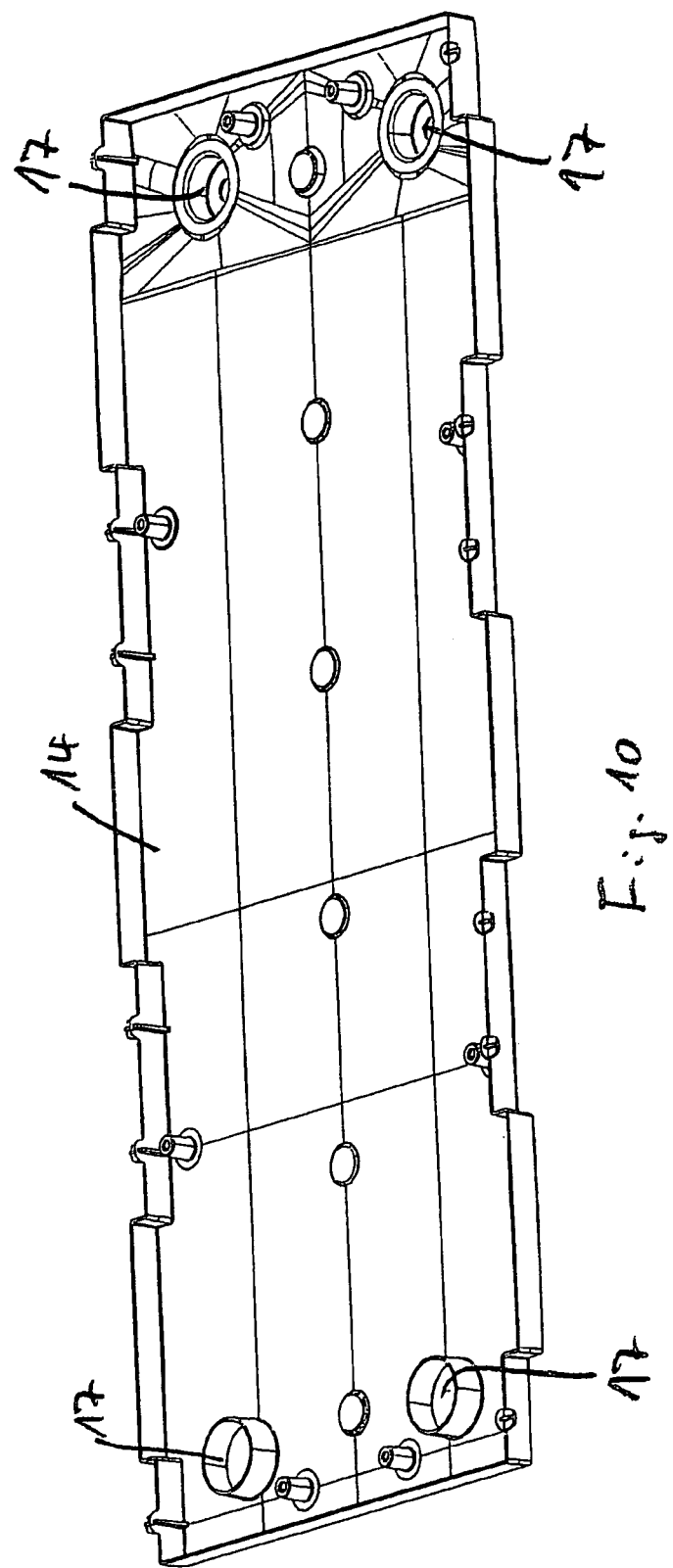

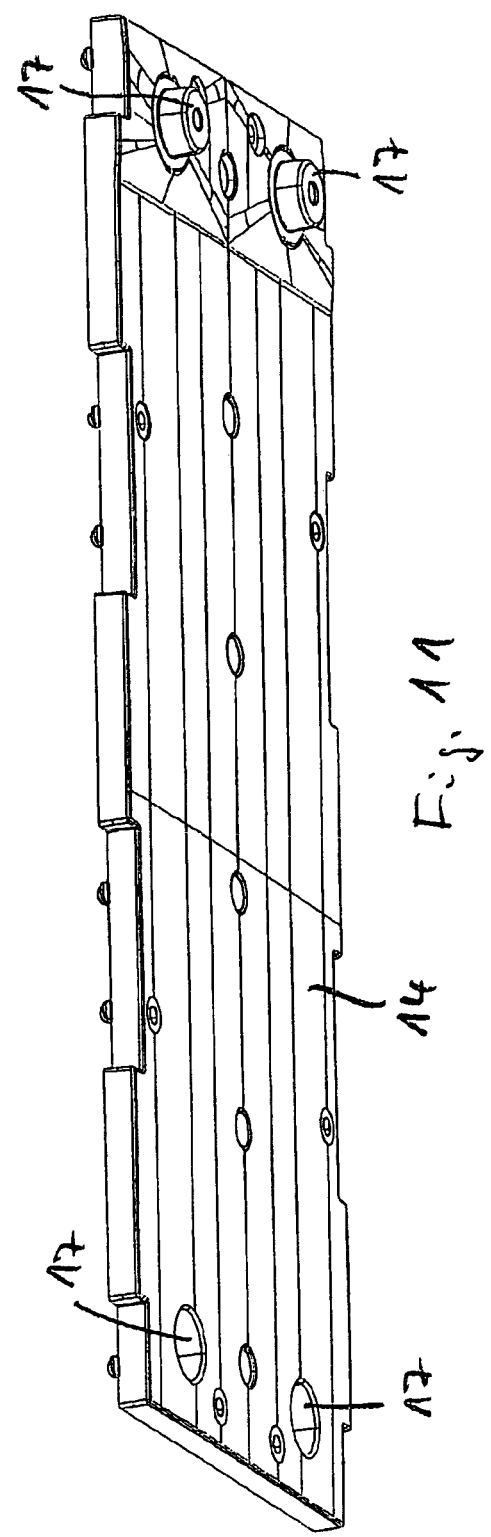

HEATABLE FLOOR FOR LIVESTOCK STALLS

CROSS REFERENCE TO RELATED APPLICATIONS

This application is the National Stage of PCT/EP2009/007788 filed on Oct. 30, 2009 which claims priority under 35 U.S.C. §119 of German Application No. 10 2008 055 777.3 filed on Nov. 4, 2008, the disclosure of which is incorporated by reference. The international application under PCT article 21(2) was not published in English.

The invention relates to a heatable floor for livestock stalls, which is composed of a plurality of hollow, rectangular plate bodies whose cavities are filled with a heat carrier fluid, particularly with water, and can be heated by means of heating lines that run through the cavities, whereby each plate body has an upper shell forming the standing surface for the livestock, provided with a filling opening, and a lower shell that supports the upper shell, in each instance, which shells are connected with one another at their edges, in fluid-tight manner, and are provided with means for suspension in carriers, and are supported on one another in their surface region by means of supports that run through the cavities.

Such a heatable floor for livestock stalls is known, for example, from DE 20 2007 009 508 U1.

A problem in these heatable floors consists in filling the cavities of the plate bodies with the heat carrier fluid, i.e. generally with water, in bubble-free manner. This difficulty particularly occurs if supports having great support strength must be disposed in the cavity of the plate body, in order to increase stability.

In the previously known floor, an attempt has been made to solve the problem indicated above in that the tops of the upper shells of the plate bodies are configured in pyramid shape, and the filling openings are disposed in the region of the pyramid peaks. In this way, the result is supposed to be achieved that the air bubbles that form in the cavities during filling rise along the slanted pyramid surfaces to the filling openings situated at the pyramid peaks. However, this only succeeds if the pyramid surfaces have a relatively steep incline angle, and if no cavities or pockets are disposed along the migration path of the air bubbles, in which the air bubbles can remain hanging. In order to avoid such pocket formation, flat, straight crosspieces are exclusively used as supports between upper shell and lower shell in the previously known plate bodies, which crosspieces, of course, can absorb only relatively slight forces and transfer them between upper shell and lower shell.

It is therefore the task of the invention to improve the heatable floor of the type mentioned initially with regard to its stability, and, at the same time, to ensure bubble-free filling.

To accomplish this task, the invention proposes, proceeding from the heatable floor of the type mentioned initially, that the supports are formed, at least in the region that borders on the upper shell from below, by pipe sockets having a round or angular cross-section, whose lateral openings are all oriented in the direction of the filling opening situated at an edge of the upper shell.

The hollow plate bodies used in the heatable floor according to the invention are extremely stable and able to carry a load, because of the use of pipe sockets as supports between upper shell and lower shell. Such cylindrical or prismatic pipe sockets have a significantly greater ability to carry a load—even if they are provided with a lateral opening—at the same expenditure of material, than narrow, straight crosspieces. Because all the lateral openings of the supports in the form of pipe sockets are oriented in the direction of a filling opening situated at the edge of the upper shell, bubble-free filling of the cavity of the plate body succeeds in that the plate body is set at a slant during filling, in such a manner that the filling opening is situated at the highest point of the cavity. Because of the particular configuration of the supports, all the surfaces that delimit the cavity in an upward direction rise toward the filling opening when the plate body is set at a slant, so that the bubbles rise in this direction, in such a manner that the air can escape at the filling connector.

Preferably, the filling openings of the plate bodies are disposed in a corner of the upper shell, in each instance. Such a filling opening, situated in a corner of the upper shell of the plate body, can be positioned at the highest point particularly easily by means of correspondingly setting the plate body at a slant.

A particularly preferred embodiment of the invention provides that the supports are configured in two parts, in each instance, and consist of lower support parts that are connected in one piece with the lower shell, as well as upper support parts that are connected in one piece with the upper shell. This two-part configuration of the supports has particularly production technology advantages. Specifically, in this manner, both the upper shell and the lower shell can be produced in simple manner, as injection-molded parts, which are subsequently connected with one another with material fit, for example by means of a mirror welding method.

In order to achieve particular rigidity and stability of the lower shell, it is provided that the lower shell is provided with reinforcement ribs that run transverse to its longitudinal sides, onto which ribs the lower support parts are formed. By means of this design embodiment, it is particularly well possible to correspondingly support the upper shell, which is subject to stress from the livestock, with the rigid lower shell.

Furthermore, it is provided that the reinforcement ribs of the lower shell are provided with contact saddles for the heating line. In this manner, it is possible, in particularly simple manner, to fix the heating line, which is for example a pipe through which hot water flows, or an electrically heated pipe, in place in the center of the cavity of the plate body. In this manner, the reinforcement ribs are more or less given a dual function, on the one hand for reinforcement and on the other hand for holding the heating line approximately in the center of the cavity.

In order to prevent heat dissipation in a downward direction, it is furthermore provided that a heat insulation plate is disposed underneath the lower shell. This heat insulation plate consists, for example, of foam material, or another correspondingly heat-insulating material, and is protected from damage in that it is covered, toward the bottom, by a cover plate that is connected with the lower shell by means of anchors that are hammered in. It is practical if screw-in connectors of the heating conductor are disposed on the underside of the lower shell, which connectors project through the heat insulation plate and the cover plate.

In order for these screw-in connectors not to be disruptive when the plate bodies are stacked for the purpose of transport, it is furthermore provided that the cover plate and the heat insulation plate are additionally provided with recesses into which the projecting screw-in connectors of an adjacent plate body, rotated by 180°, fit when the plate bodies are stacked. In this manner, it is possible to significantly reduce the packing dimensions of the plate bodies during their transport and delivery.

Furthermore, it is provided that the side edges of the plate bodies are provided with hook strips that can be suspended in carriers. It is practical if these hook strips, which are configured as separate injection-molding parts, are attached on the plate body in the region of the rigid lower shell, and, together with the rigid lower shell, allow very stable attachment of the plate to the carriers of the substructure.

Finally, it is provided that the top of the upper shell is provided with an alternating coarse and fine profiling, which gives the livestock standing on the heatable floor a good footing. Furthermore, a drip edge is provided at the edge of the top of the upper shell, which drip edge is intended to prevent fluid from dripping down.

Figure 2:
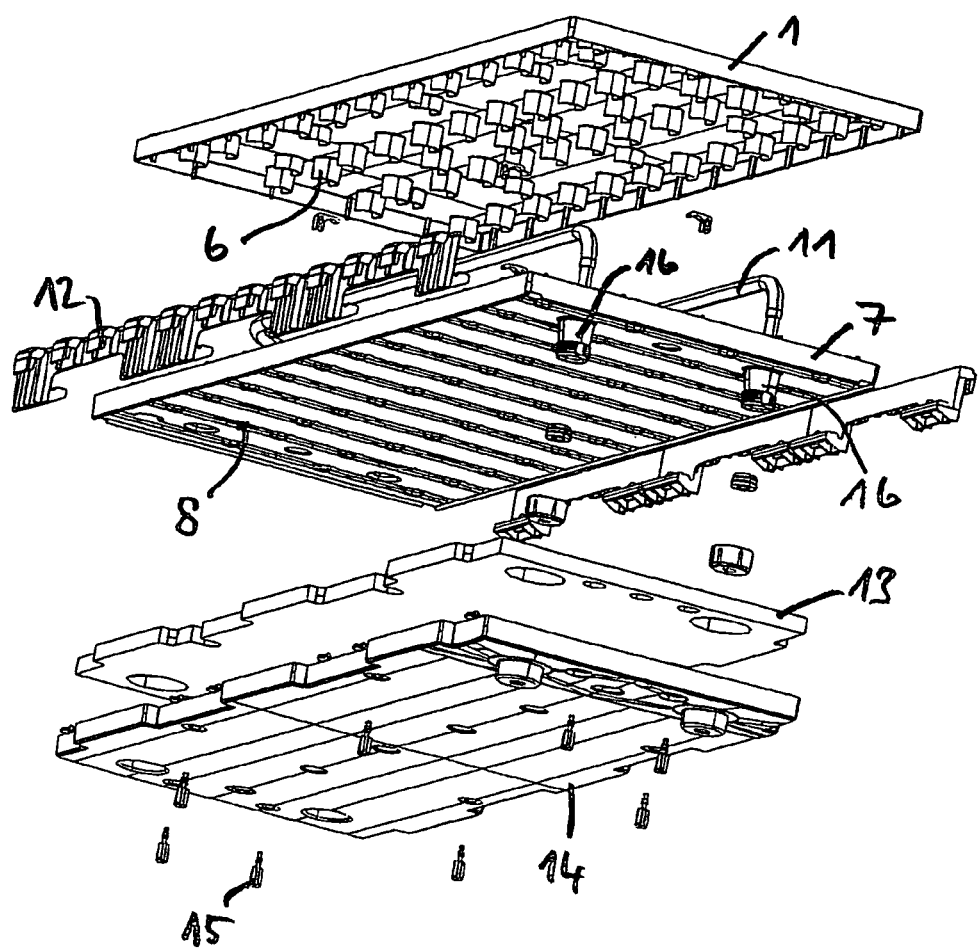
Figure 3:
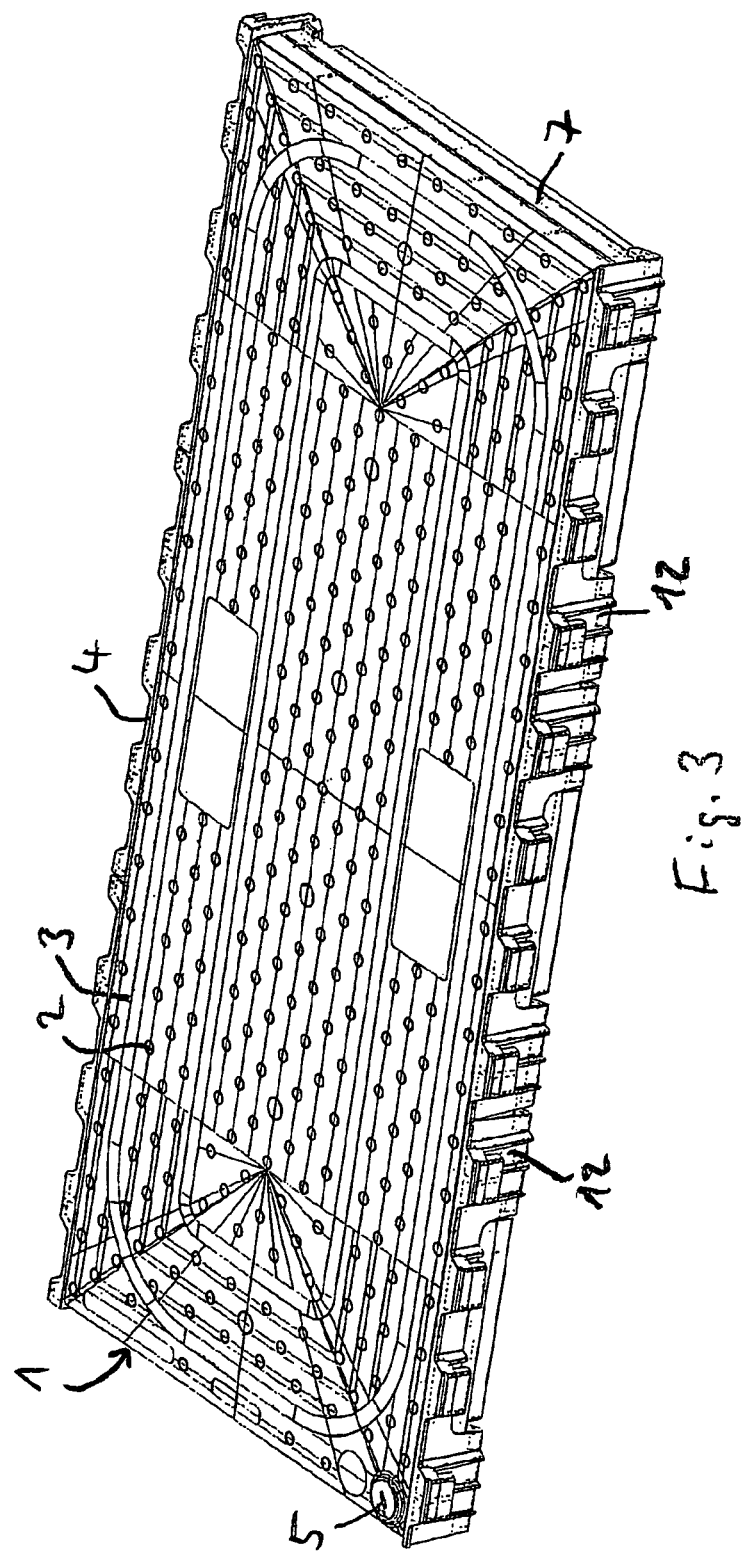
Figure 4:
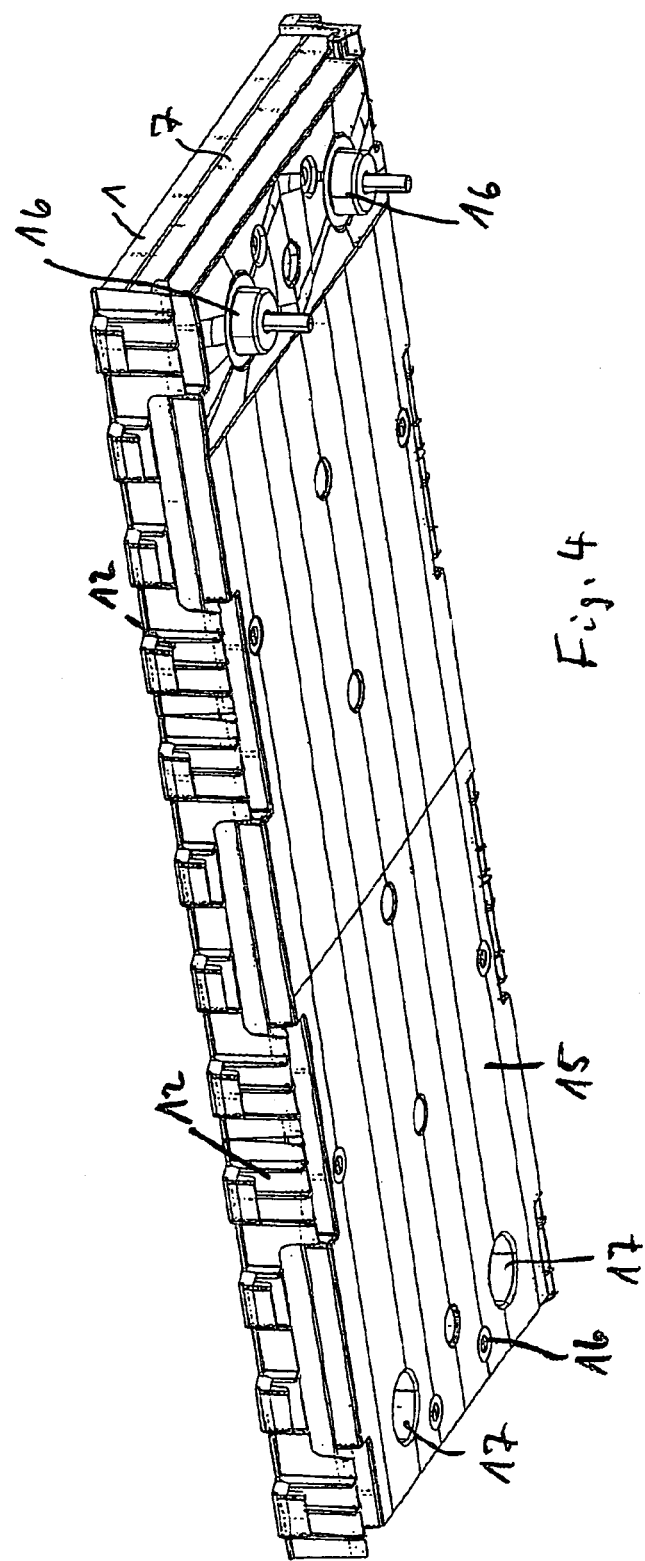
Figure 5:
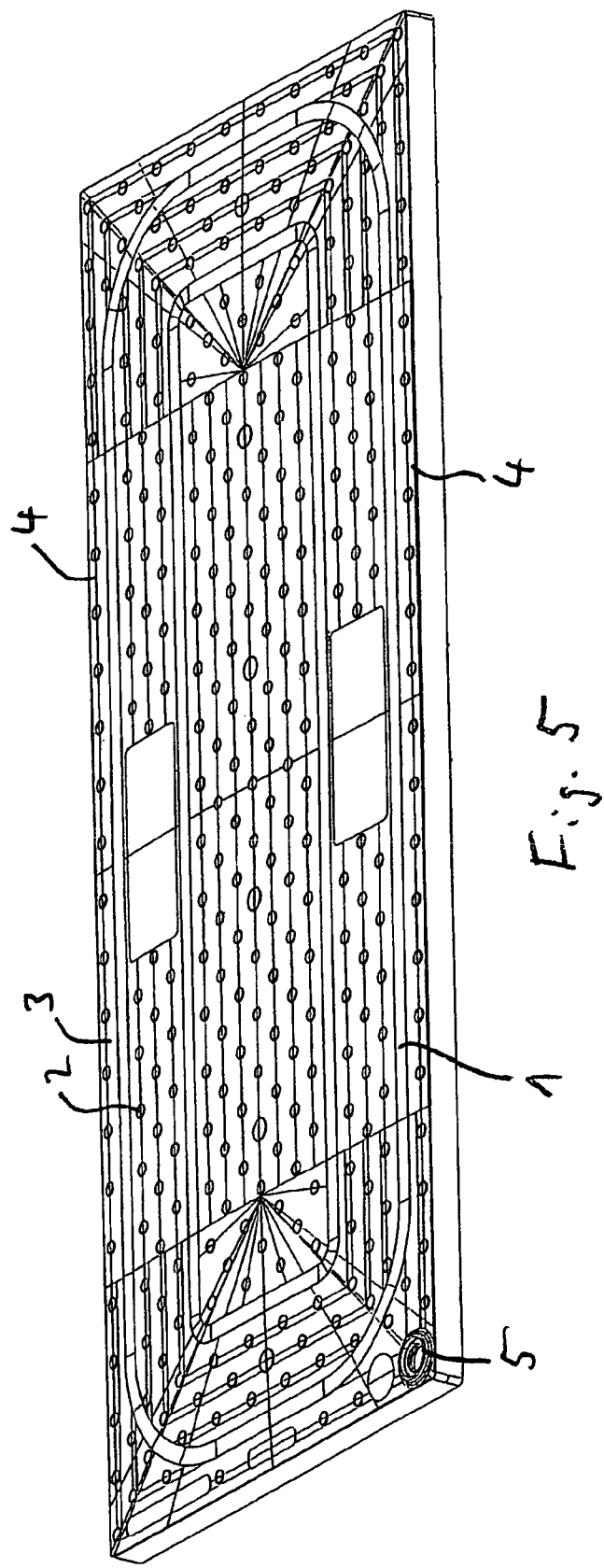
Figure 6:
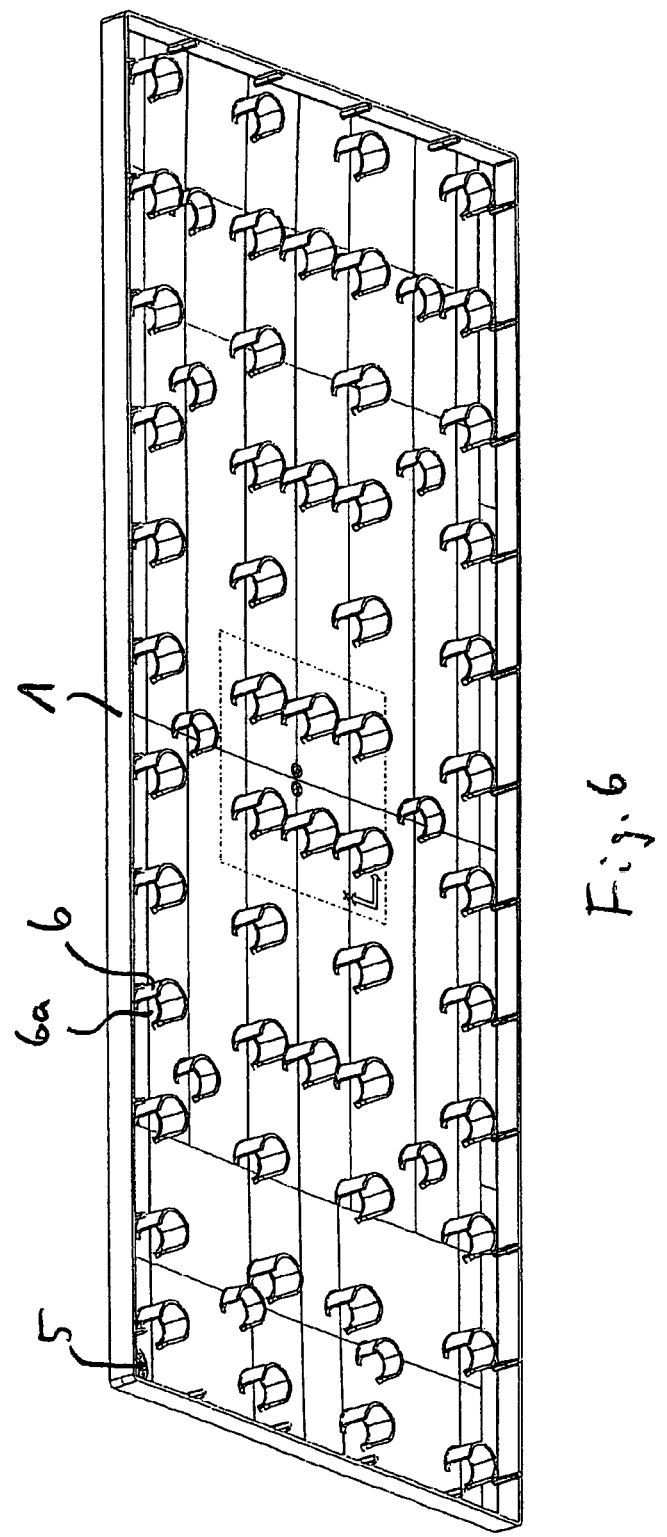
Figure 7:
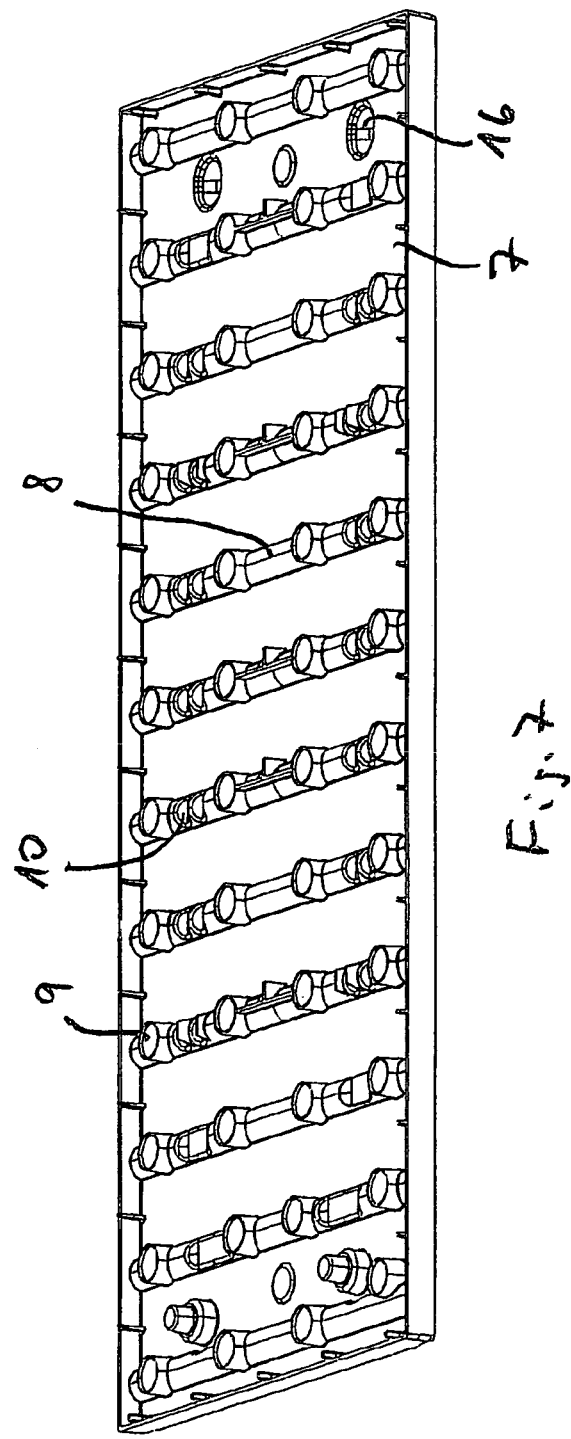
Figure 8:
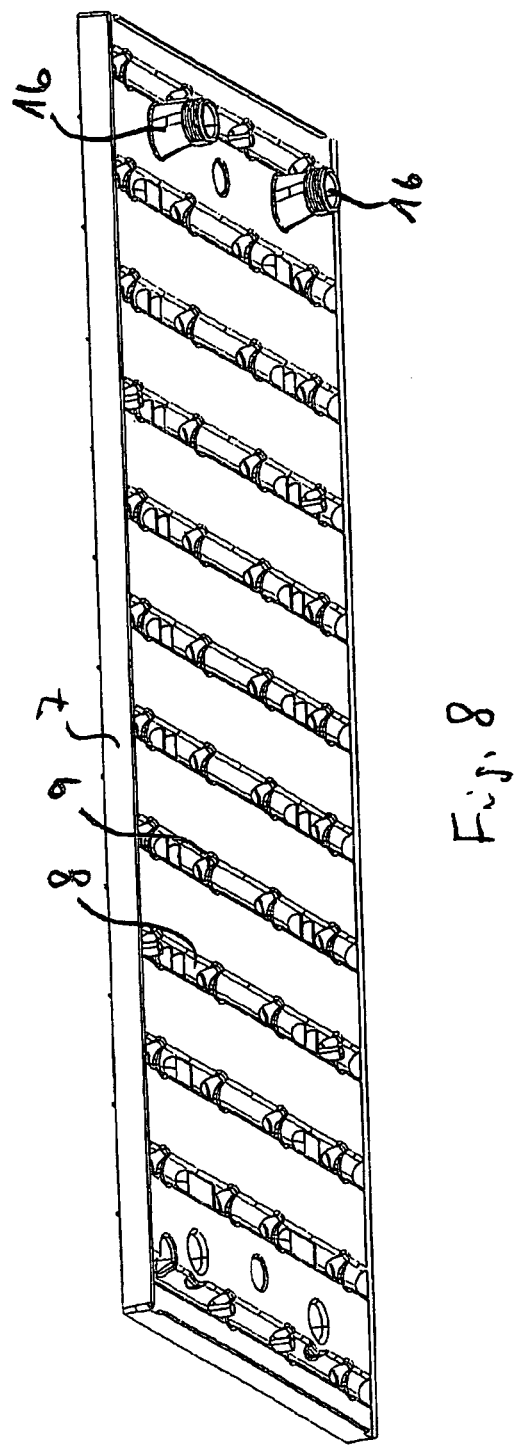
Figure 9:
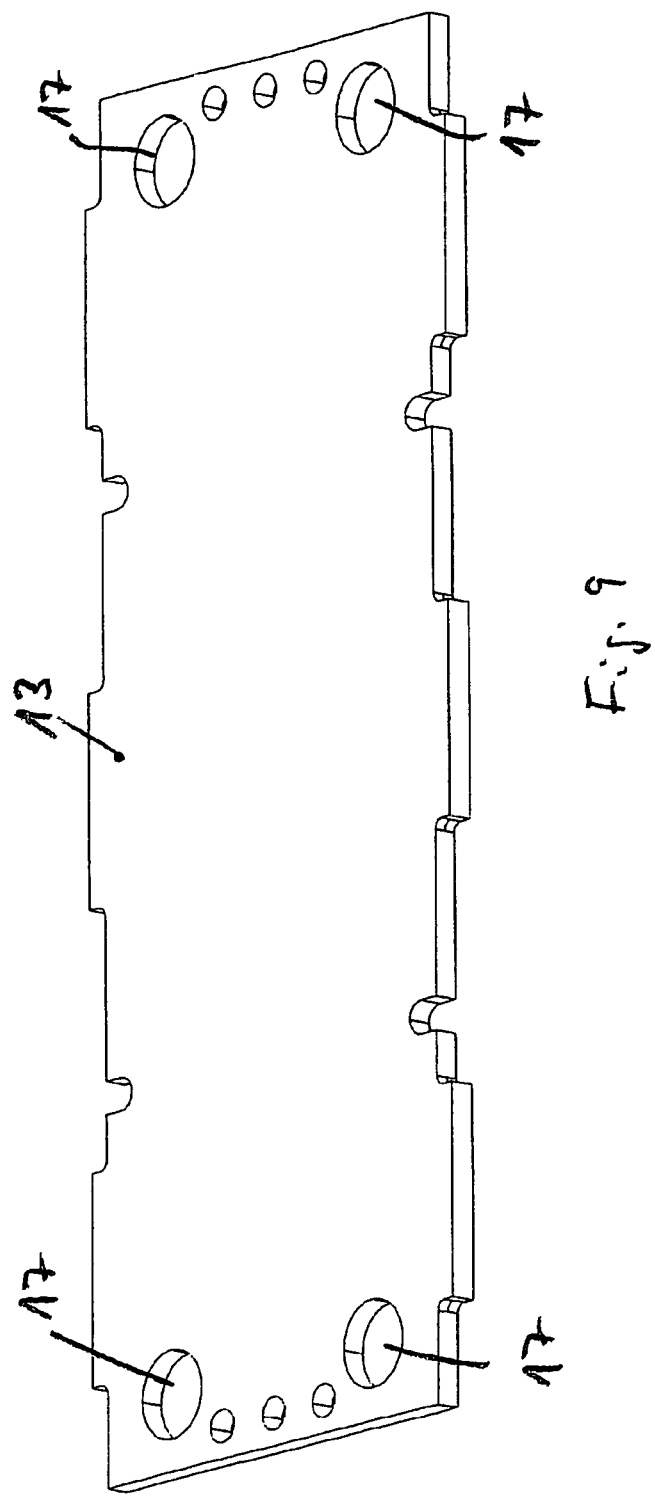

An exemplary embodiment of the invention will be explained in greater detail in the following, using the drawing. This shows:

FIG. 1: The parts of a plate body according to the invention, in an exploded representation, at a slant from above;

FIG. 2: the parts of a plate body according to the invention, in an exploded representation, at a slant from below;

FIG. 3: in perspective, the plate body according to the invention, in the finished, assembled state, from above;

FIG. 4: in perspective, the plate body according to the invention, in the finished, assembled state, from below;

FIG. 5: in perspective, the upper shell from above;

FIG. 6: the upper shell from below;

FIG. 7: in perspective, the lower shell from above;

FIG. 8: in perspective, the lower shell from below;

FIG. 9: in perspective, the heat insulation plate from above;

FIG. 10: in perspective, the cover plate from above;

FIG. 11: in perspective, the cover plate from below.

In FIG. 1, the upper shell of the plate body is indicated with the reference symbol 1. This upper shell 1 is provided with an alternating fine and coarse profiling 2, 3 on its top, which is supposed to give the livestock standing on the floor a good footing. Furthermore, the upper shell 1 is provided with a circumferential drip edge 4, which is supposed to prevent fluids from dripping down. Such fluids would get to the underside of the plate body and evaporate there and leave undesirable deposits. Likewise, the fluids dripping down could penetrate into the insulation of the plate body, which will still be explained below.

Furthermore, the upper shell 1 is provided with a filling opening 5 at the left upper corner, by way of which opening the cavity of the plate body can be filled with heating fluid, for example water, as will still be explained below. The filling tap 5 has not only the actual inlet opening but also ventilation bores concentrically grouped around the inlet opening, in order to allow the air that is displaced during filling to escape.

On its underside (see FIGS. 2 and 6), the upper shell 1 is provided with a plurality of upper support parts 6 in the form of pipe sockets that are open toward the side, which have an opening 6a laterally, in each instance, all of which openings are oriented in the direction of the filling opening 5.

These upper support parts 6 support the surface of the upper shell 1 over a large area, and ensure bubble-free ventilation, as will still be explained below.

A lower shell 7 is disposed below the upper shell 1; it is provided with reinforcement ribs 8 that run transverse to its longitudinal direction. Lower support parts 9 are formed onto these reinforcement ribs 8; these, just like the upper support parts 6, are configured in the form of pipe sockets, and are welded to the upper support parts 6 when upper shell 1 and lower shell 7 are welded together. It is practical if this weld connection between upper shell 1 and lower shell 7 is produced using the mirror welding method.

The reinforcement ribs 8 of the lower shell 7 are furthermore provided with contact saddles 10 for a heating line 11, which is configured as a pipe elbow here, through which hot water or steam flows. The heating line 11 is held approximately in the center of the cavity of the finished, assembled plate body by the contact saddles 10 of the reinforcement ribs 8.

Hook strips 12 are attached on the longitudinal sides of the lower shell 7; these serve, for one thing, for reinforcing the edges of the plate body, and are used, for another thing, for suspending the plate body into carriers of the substructure.

Underneath the lower shell 7, there is a heat insulation plate 13 that consists of foam material or a similar suitable heat-insulating material. In order to protect this heat insulation plate 13 from damage, it is covered, in the downward direction, by a cover plate 14 that is connected with the lower shell 7 by means of anchors 15 that are hammered in.

The lower shell 7 is furthermore provided with screw-in connectors 16 for the heating line 11, which connectors project through the heat insulation plate 13 and the cover plate 14. In order for these screw-in connectors 16, which project beyond the cover plate 14, not to be disruptive when the plate bodies are stacked, the heat insulation plate 13 and the cover plate 14 are provided with recesses 17 into which the projecting screw-in connectors 16 of an adjacent plate body, rotated by 180°, fit when the plate bodies are stacked.

In order to fill the finished, assembled plate body, it is set at a slant, in such a manner that the filling opening 5 is situated at the highest point. Then, the heat carrier fluid, for example water, is filled in by way of the filling opening 5. In this connection, the cavity of the plate fills with water, rising from bottom to top, and displaces the air contained in the body. Because the lateral openings of the upper support parts 6, which are in the form of pipe sockets, are all open in the direction of the filling opening, no pockets in which the rising air could be held back are formed in the cavity of the plate body. Instead, the heat carrier fluid (water) is distributed over a large area and uniformly over the underside of the upper shell 1, so that the latter is heated very uniformly and, at the same time, is uniformly supported, over a large area, by the upper support parts 6 that are in the form of pipe sockets. The support forces are uniformly introduced into the lower shell 7, and, by way of the rigid construction of the lower shell 7, into the hook strips 12 and the carriers.

The invention claimed is:

1. Heatable floor for livestock stalls, which is composed of a plurality of hollow, rectangular plate bodies having cavities filled with a heat carrier liquid and heatable via heating lines that run through the cavities, whereby each plate body has an upper shell forming a standing surface for the livestock, provided with a filling opening, and a lower shell that supports the upper shell, in each instance, which shells are connected with one another at their edges, in fluid-tight manner, and are provided with devices for suspension, the devices for suspension allowing the heatable floor to be suspendable in carriers, and which shells are supported on one another in surface regions of the shells via supports that run through the cavities, wherein the supports are formed, at least in the region that borders on the upper shell from below, by pipe sockets having a round or angular cross-section and having lateral openings all oriented in the direction of the filling opening situated at an edge of the upper shell.

2. Floor according to claim 1, wherein the filling openings of the plate bodies are disposed in a corner of the upper shell, in each instance.

3. Floor according to claim 1, wherein the supports are configured in two parts, in each instance, and comprise lower support parts that are connected in one piece with the lower shell, as well as upper support parts that are connected in one piece with the upper shell.

4. Floor according to claim 1, wherein the lower shell is provided with reinforcement ribs that run transverse to its longitudinal edges, which ribs are formed onto the lower support parts.

5. Floor according to claim 4, wherein the reinforcement ribs of the lower shell are provided with contact saddles for the heating line.

6. Floor according to claim 1, wherein a heat insulation plate is disposed underneath the lower shell.

7. Floor according to claim 6, wherein the heat insulation plate is covered, in a downward direction, by a cover plate that is connected with the lower shell via anchors that are hammered in.

8. Floor according to claim 6, wherein screw-in connectors are assigned to the heating line on the underside of the lower shell, which connectors project through the heat insulation plate and the cover plate.

9. Floor according to claim 8, wherein the cover plate and the heat insulation plate are additionally provided with recesses into which the projecting screw-in connectors of an adjacent plate body, rotated by 180°, fit when the plate bodies are stacked.

10. Floor according to claim 1, wherein the side edges of the plate body are connected with hook strips that can be suspended in carriers.

11. Floor according to claim 10, wherein the hook strips are attached to the plate body, with shape fit, in the region of the lower shell.

12. Floor according to claim 1, wherein the tops of the upper shells are provided with a combined coarse and fine profiling, as well as with a drip edge.

* * * * *

UNITED STATES PATENT AND TRADEMARK OFFICE
CERTIFICATE OF CORRECTION

PATENT NO.      : 8,707,904 B2  
APPLICATION NO. : 12/998564  
DATED           : April 29, 2014  
INVENTOR(S)     : Ertel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 231 days.

Signed and Sealed this

Twenty-ninth Day of September, 2015

Michelle K. Lee  
*Director of the United States Patent and Trademark Office*